US012039225B2

(12) United States Patent
Alsina et al.

(10) Patent No.: US 12,039,225 B2
(45) Date of Patent: *Jul. 16, 2024

(54) AUTOMATED CONTENT MEDIUM SELECTION

(71) Applicant: Apple Inc., Cupertino, CA (US)

(72) Inventors: Thomas Alsina, Mountain View, CA (US); Arvind S. Shenoy, San Jose, CA (US); Daniel Cartoon, Cupertino, CA (US); Jeffrey L. Robbin, Los Altos, CA (US); Mark Levy, London (GB)

(73) Assignee: Apple Inc., Cupertino, CA (US)

( * ) Notice: Subject to any disclaimer, the term of this patent is extended or adjusted under 35 U.S.C. 154(b) by 18 days.

This patent is subject to a terminal disclaimer.

(21) Appl. No.: 17/652,783

(22) Filed: Feb. 28, 2022

(65) Prior Publication Data

US 2023/0008201 A1    Jan. 12, 2023

Related U.S. Application Data

(63) Continuation of application No. 14/869,635, filed on Sep. 29, 2015, now Pat. No. 11,262,972.

(60) Provisional application No. 62/171,975, filed on Jun. 5, 2015.

(51) Int. Cl.
*G06F 3/16* (2006.01)
(52) U.S. Cl.
CPC .................................. *G06F 3/165* (2013.01)
(58) Field of Classification Search
CPC ...... G06F 3/165; G06F 16/637; G06F 16/639; G06F 16/435; G06F 16/48; G06F 16/24578; G06F 16/4387; G06F 12/0806; H04L 65/60; H04W 4/21; H04N 21/632; H04N 21/25841
See application file for complete search history.

(56) References Cited

U.S. PATENT DOCUMENTS

| 7,840,691 | B1 | 11/2010 | De Bonet |
| 8,492,638 | B2 | 7/2013 | Faenger |
| 8,613,022 | B2 | 12/2013 | Okajima |
| 8,971,541 | B2 | 3/2015 | Marko |
| 9,503,500 | B2 | 11/2016 | Bernhardsson |
| 9,531,989 | B1 | 12/2016 | Jehan |
| 2005/0021470 | A1 | 1/2005 | Martin |
| 2007/0067429 | A1* | 3/2007 | Jain ................. G06F 16/435 709/223 |
| 2012/0088477 | A1* | 4/2012 | Cassidy ................. H04W 4/21 455/414.1 |
| 2012/0215878 | A1 | 8/2012 | Kidron |

(Continued)

*Primary Examiner* — Yogeshkumar Patel
(74) *Attorney, Agent, or Firm* — Blank Rome LLP

(57) ABSTRACT

A content management system and/or client device can enable a user to initiate a quick play mode where a content category and content medium are selected for the user. A client device and/or a content management system can select a content medium for a user based on one or more factors, such as the content category. Certain content categories of content can be preferably delivered in certain content mediums. In some embodiments, a content management system and/or client device can select a content medium for a user based on contextual data gathered from the user. Contextual data can be data describing the user's current state and/or environment. For example, contextual data can include data such as the time of day, geographic location, etc.

20 Claims, 5 Drawing Sheets

(56) References Cited

U.S. PATENT DOCUMENTS

| | | | |
|---|---|---|---|
| 2012/0222050 A1* | 8/2012 | Kidron | G06F 21/10 |
| | | | 719/318 |
| 2013/0031177 A1 | 1/2013 | Willis | |
| 2013/0219423 A1* | 8/2013 | Prickett | H04L 65/762 |
| | | | 725/32 |
| 2014/0074861 A1* | 3/2014 | Bieschke | H04N 21/44224 |
| | | | 707/748 |
| 2014/0114985 A1 | 4/2014 | Mok | |
| 2014/0223099 A1* | 8/2014 | Kidron | G06F 16/435 |
| | | | 711/118 |
| 2014/0277649 A1* | 9/2014 | Chong | G06F 16/90324 |
| | | | 700/94 |
| 2015/0230022 A1 | 8/2015 | Sakai | |
| 2015/0245138 A1* | 8/2015 | Bender | H04R 3/12 |
| | | | 381/80 |
| 2015/0381682 A1* | 12/2015 | Rao | G06F 16/972 |
| | | | 709/219 |
| 2016/0241976 A1* | 8/2016 | Pearson | G11B 27/11 |
| 2016/0335045 A1* | 11/2016 | Medaghri Alaoui | |
| | | | H04N 21/233 |
| 2016/0357506 A1 | 12/2016 | Alsina | |

\* cited by examiner

AUTOMATED CONTENT MEDIUM SELECTION

CROSS REFERENCE TO RELATED APPLICATIONS

This application is a continuation of U.S. application Ser. No. 14/869,635 titled "AUTOMATED CONTENT MEDIUM SELECTION" filed on Sep. 29, 2015, which claims the benefit of U.S. provisional application No. 62/171,975 titled "AUTOMATED CONTENT MEDIUM SELECTION" filed on Jun. 5, 2015, which is hereby expressly incorporated by reference in its entirety

TECHNICAL FIELD

The present technology pertains to content item selection and more specifically pertains to selecting a medium for the selected content items.

BACKGROUND

With the advent of digital content players and other types of mobile computing devices, people are accumulating vast libraries of digital content. In many cases, personal content libraries include songs, movies, podcasts, etc., added from physical media such as CD, SACD, and DVD as well as content downloaded from online content retailers.

While mobile computing devices allow users to enjoy their content virtually anywhere, growing content libraries are becoming more and more difficult to effectively manage. For example, handcrafting a playlist typically involves the tedious process of searching through a large content library to find appropriate content items, selecting the content items, selecting an order for the content items and hoping that no desirable content items are overlooked. Some current technologies will automate this process and generate and play a playlist for a user, however these generated playlists are often selected based on very little input of the user and often select songs at random for a user.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for selecting a content medium in which to deliver content to a user. Content can be delivered in multiple content mediums. Example content mediums can include, podcast, album, user selected playlist, computer generated playlist, online radio station, editorial playlist, playlists from external curators, etc.

A client device and/or a content management system can select a content medium for a user based on one or more factors, criteria, etc. For example, a client device and/or content management system can select a content medium based on a content category that is to be delivered to the user. A content category can be any type of categorization of the content, such as categorization based on content type, style, artists, era, genre, etc. or a combination thereof. Certain content categories can be preferably delivered in certain content mediums. As an example, a content category such as news may be preferably delivered as a podcast. As another example, a content category such as audio books may be preferably delivered as an entire album, a playlist of audio chapters or other appropriate medium. As another example, a content category such as 80's hits may be preferably delivered as a playlist or online radio station.

In some embodiments, a content management system and/or client device can select a content medium for a user based on contextual data gathered from the user. Contextual data can be data describing the user current state and/or environment. For example, contextual data can include data such as the time of day, geographic location, user activity, biometric information gathered from the user, etc.

Additionally, a content management system and/or client device can select a content medium for a user based on user preference data and content use data associated with the user and/or a group of users. User preference data can be data indicating the users likes and dislikes associated with content, such as user provided preference data or derived preference data. Content use data can be data gathered from and/or describing user interaction with content. For example, content use data can identify the content medium selected by a user to deliver a specified content category, as well identify any contextual data such as time of day, geographic location, etc. when the user selected the content medium. The content player can analyze the historical content data to select a content medium for a user based on a specified content category, as well as contextual data describing the current state and/or environment of the user.

In some embodiments, the client device and/or content management system can enable a user to select a "quick play" option to initiate playback of content. In response to selection of the quick play, the client device and/or content management system can select a content category for the user as well as a content medium to deliver the content. The user can continually select the quick play option to cause the client device and/or content management system to select a different content category and content medium.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Figure 1:
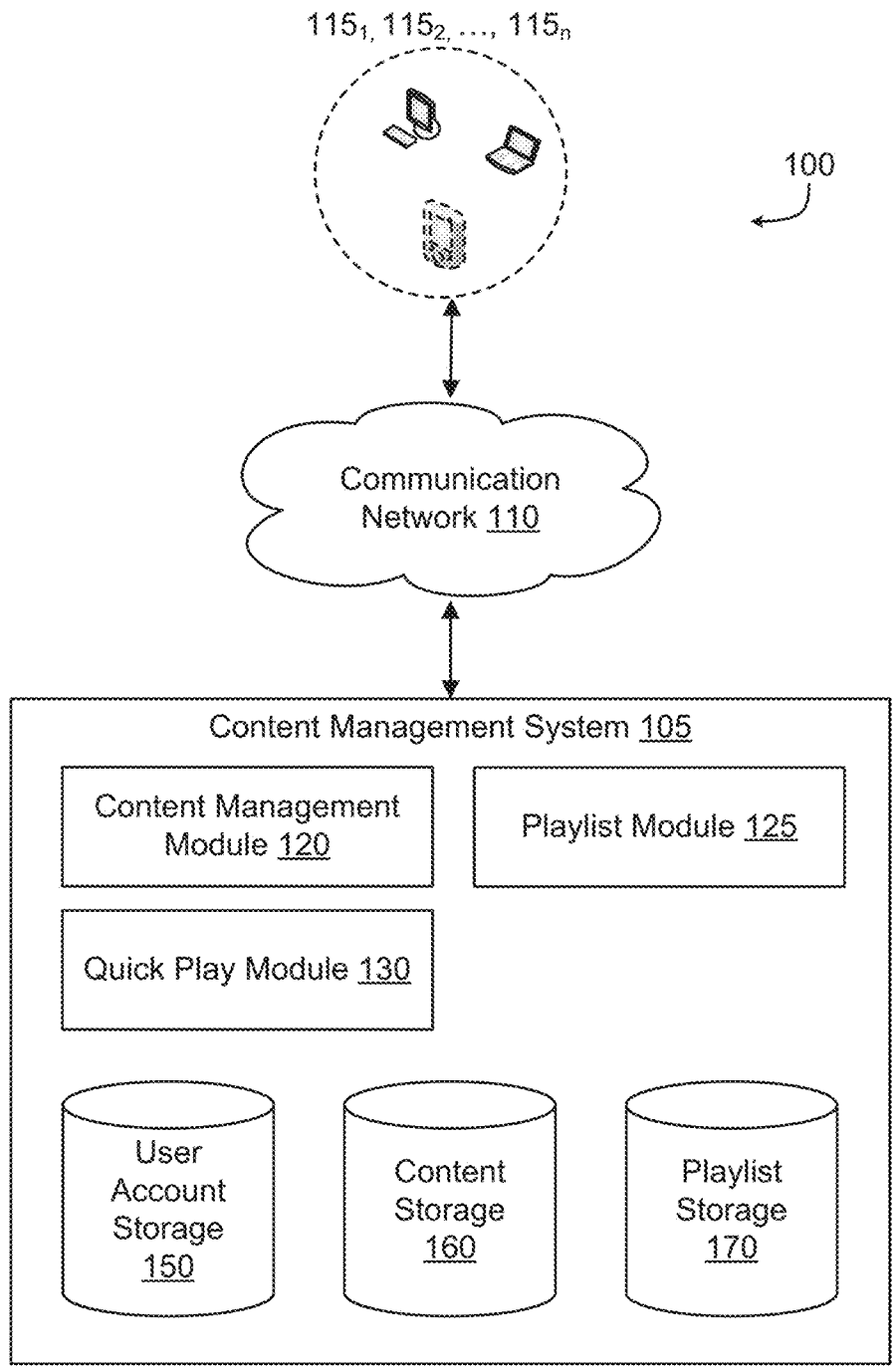
FIG. 1 shows an exemplary configuration of devices and a network in accordance with the invention.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for selecting a content medium in which to deliver content to a user. Content can be delivered in multiple content mediums. Example content mediums can include podcast, album, user created playlist, computer generated playlist, radio station, etc.

A client device and/or a content management system can select a content medium for a user based on one or more factors, criteria, etc. For example, a client device and/or content management system can select a content medium based on a content category that is to be delivered to the user. A content category can be any type of categorization of the content, such as categorization based on content type, style, artists, era, category, etc. or a combination thereof. Certain content categories can be preferably delivered in certain content mediums. As an example, a content category such as news may be preferably delivered as a podcast. As another example, a content category such as audio books may be preferably delivered as an entire album, a playlist of audio chapters or other appropriate medium. As another example, a content category such as 80's hits may be preferably delivered as a playlist.

In some embodiments, a content management system and/or client device can select a content medium for a user based on contextual data gathered from the user. Contextual data can be data describing the user current state and/or environment. For example, contextual data can include data such as the time of day, geographic location, etc.

Additionally, a content management system and/or client device can select a content medium for a user based on content use data associated with the user and/or a group of users. Content use data can be data gathered from and/or describing user interaction with content. For example, content use data can identify the content medium selected by a user to deliver a specified content category, as well identify any contextual data such as time of day, geographic location, etc. when the user selected the content medium. The content player can analyze the historical content data to select a content medium for a user based on a specified content category, as well as contextual data describing the current state and/or environment of the user.

In some embodiments, the client device and/or content management system can enable a user to select a "quick play" mode to initiate playback of content. In response to selection of the quick play mode, the client device and/or content management system can select a content category for the user as well as a content medium to deliver the content. The user can continually select the quick play mode to cause the client device and/or content management system to select a different content category and content medium.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

FIG. 1 illustrates an exemplary system configuration 100, wherein electronic devices communicate via a network for purposes of exchanging content and other data. As illustrated, multiple computing devices can be connected to communication network 110 and be configured to communicate with each other through use of communication network 110. Communication network 110 can be any type of network, including a local area network ("LAN"), such as an intranet, a wide area network ("WAN"), such as the internet, or any combination thereof. Further, communication network 110 can be a public network, a private network, or a combination thereof. Communication network 110 can also be implemented using any number of communication links associated with one or more service providers, including one or more wired communication links, one or more wireless communication links, or any combination thereof. Additionally, communication network 110 can be configured to support the transmission of data formatted using any number of protocols.

Multiple computing devices can be connected to communication network 110. A computing device can be any type of general computing device capable of network communication with other computing devices. For example, a computing device can be a personal computing device such as a desktop or workstation, a business server, or a portable computing device, such as a laptop, smart phone, or a tablet PC. A computing device can include some or all of the features, components, and peripherals of computing device 500 of FIGS. 5A and 5B.

To facilitate communication with other computing devices, a computing device can also include a communication interface configured to receive a communication, such as a request, data, etc., from another computing device in network communication with the computing device and pass the communication along to an appropriate module running on the computing device. The communication interface can also be configured to send a communication to another computing device in network communication with the computing device.

In system 100, a user can interact with content management system 105 through client devices $115_1$, $115_2$, ..., $115_n$ (collectively "115") connected to communication network 110 by direct and/or indirect communication. Content management system 105 can support connections from a variety of different types of client devices 115, such as desktop computers; mobile computers; mobile communications devices (e.g. mobile phones, smart phones, tablets, etc.); smart televisions; set-top boxes; and/or any other network enabled computing devices. Client devices 115 can be of varying type, capabilities, operating systems, etc. Furthermore, content management system 105 can concurrently accept connections from and interact with multiple client devices 115.

A user can interact with content management system 105 via a client-side application installed on client device $115_i$. In some embodiments, the client-side application can include a content management system specific component. For example, the component can be a stand-alone application, one or more application plug-ins, and/or a browser extension. However, the user can also interact with content management system 105 via a third-party application, such as a web browser, that resides on client device $115_i$ and is configured to communicate with content management system 105. In either case, the client-side application can present a user interface (UI) for the user to interact with content management system 105. For example, the user can interact with content management system 105 via a client-side application integrated with the file system or via a webpage displayed using a web browser application.

Content management system 105 can be configured to manage content items for multiple user accounts. For example, content management system 105 can allow users to purchase, store and access content items. Furthermore, content management system 105 can make it possible for a user to access the content items from multiple client devices 115. Accessing a content item can include receiving metadata describing the content item, streaming the content item from content management system 105 and/or downloading the content item to one of client devices 115.

To facilitate the various content management services, a user can create a user account with content management system 105. The account information for each created user account can be maintained in user account storage 150. User account storage 150 can store profile information for each user account, including a unique account identifier identifying the user account, personal information, username, password, email address, home address, credit card information, banking information, etc. User account storage 150 can also include account management information, such as content storage locations, security settings, personal configuration settings, client devices authorized to access the user account, etc.

A user account can be used to purchase, manage and store content items, such as digital data, documents, text files, audio files, video files, etc. For example, content management system 105 can provide an online content retailer where users can purchase a variety of content items. Further, in some embodiments, a user can upload content items from one of client devices 115 to content management system 105. The purchased and uploaded content items can be assigned to the user's account and then accessed by the user from any of client devices 115. For example, a content item identifier identifying each content item assigned to a user account can be stored in user account storage 150 and associated with the corresponding user account. The content item identifier can be used to identify the content item as well as the location of the content item.

The content items can be stored in content storage 160. Content storage 160 can be a storage device, multiple storage devices, or a server. Alternatively, content storage 160 can be a cloud storage provider or network storage accessible via one or more communications networks. Content management system 105 can hide the complexity and details regarding storage of the content items from client devices 115 such that the location of the content items stored by content management system 105 is not known by client devices 115. Content management system 105 can store the content items in a network accessible storage (SAN) device, in a redundant array of inexpensive disks (RAID), etc. Content storage 160 can store content items using one or more partition types, such as FAT, FAT32, NTFS, EXT2, EXT3, EXT4, ReiserFS, BTRFS, and so forth.

Content storage 160 can also store metadata describing content items, content item types, and the relationship of content items to various user accounts. For example, the metadata can describe the content items, such as identify an author, artist, genre, content category, release date, album, title, image, etc., associated with the respective content item. The metadata for a content item can be stored as part of the content item or can be stored separately. In one variation, each content item stored in content storage 160 can be assigned a system-wide unique identifier.

Content management system 105 can include content management module 120 configured to manage and access each user account and the content items assigned to the user accounts. For example, content management module 120 can be configured to communicate with user account storage 150 and content storage 160 to adjust privileges with respect to content items and otherwise manage content items.

Upon a user logging into their user account from one of client devices 115, content management module 120 can access the account information associated with the user account to identify the content items assigned to the user account, as well as account configuration data dictating presentation of the content items. Content management module 120 can then present and/or provide the content items to the user according to the account configuration data. For example, content management module 120 can access a user account to identify the content item identifiers assigned to the user account. The content item identifier can then be used to identify and locate the content items assigned to the user account, which can be presented according to the account configuration data.

Presenting the content items can include transmitting metadata describing the content items to client device $115_i$ that was used to access the user account. Client device $115_i$ can then use the received metadata to present the content items that the user account can access. For example, client device $115_i$ can present information identifying the content items available to the user account in a content item library. This can include presenting the title of the content items, images such as an album or book cover, description of the content item, etc.

Content management system 105 can further enable users to create and play playlists. A playlist can be made up of a set of content items ordered sequentially to be played in the specified order. For example, a playlist can include multiple songs selected by a user to be played in a specified sequential order such that upon playback of a first song in the playlist completing, playback of the next song ordered in the playlist begins. Playlists can also be shuffled or dynamically evaluated based on selected criteria.

A playlist can be comprised of any type or combination of types of content items, such as songs, movies, television shows, videos, books, audio files, etc. For example, a playlist can include content items of a single type, such as a playlist including only songs. Alternatively, a playlist can include content items of multiple types, such as a playlist including songs and videos.

Content management system 105 can include playlist storage 170 configured to maintain multiple playlist records. Each playlist record can correspond to a single playlist and include data defining the playlist. For example, a playlist record can include a list of content item identifiers that identify the content items included in the playlist. A playlist record can also identify a sequential order for the content items in the playlist. For example, a playlist record can be an array, linked list, or other data object which lists or maintains the content item identifiers in the sequential order in which their corresponding content items are ordered in the playlist.

In addition to enabling a user to create a playlist, content management system 105 can also maintain curated playlists. A curated playlist can be a playlist created by a person or entity, such as a music expert, editor, music fan, celebrity, company, algorithm etc. Content management system 105 can allow users to access a listing of curated playlist and select to play the curated playlists.

Content management system 105 can further enable a user to initiate a "quick play" mode. Quick play mode can result in content items being played for the user without the user providing any additional input regarding which content items, albums, playlists, etc., the user would like played. For example, a user that does not want to take the time to navigate through their entire content library to select a content medium can initiate quick play mode to be presented with content likely to appeal to the user. As a second example, a user that does not want to navigate through their entire content library to select content items or create a playlist can simply initiate quick play mode to be presented with content (e.g., listening to, watching, reading, etc., content).

Content management system 105 can include quick play module 130 configured to initiate quick play mode. For example, quick play module 130 can be configured to receive a quick play mode request from a client device $115_i$ indicating that a user of the client device $115_i$ would like to initiate a quick play mode. In response, quick play module 130 can select and play content items for the user. For example, a user can be presented with a user interface element, such as a button, that the user can actuate to initiate quick play mode. Actuation of the user interface element can cause the user's client deice $115_i$ to transmit a quick play mode request to content management system 105.

Quick play module 130 can select a content category to be played for the user as well as a content medium to deliver the content. In some embodiments, quick play module 130 can select a content category for a user based on user preference data associated with the user. For example, quick play module 130 can communicate with user account storage 150 to access the user's account and gather user preference data of the user.

The user preference data can indicate the user's preferences regarding content. For example, user preference data can include user provided preference data indicating the user's likes and dislikes associated with content, such as user selections of genres, content categories, artists, albums, content items, etc., that the user likes or dislikes. Further, user preference data can include user feedback provided by a user, such as a user rating, like or dislike, etc., provided by the user associated with a content item or grouping of content items.

User preference data can further include content use data describing the user's interaction with content. For example, content use data can include a log of the content items the user has selected to play, such as songs, albums, artist that the user has selected to listen to, as well as the content medium the user selected to deliver the content, such as podcast, playlist, album, curated playlist, etc. The content use data can further include contextual data describing the user's state and/or environment when the user selected the content items. For example, the contextual data can include the time of day, day of year, geographic location of the user, type of client device, network connection, etc., when the user played the content items.

Quick play module 130 can analyze the user preference data to a select a content category for the requesting user. For example, quick play module 130 can identify a set of content categories that the user likes and then select a content category from the set of content categories. Quick play module 130 can select a content category from the set of content categories in any known order, such as at random, alternating order, etc.

Alternatively, in some embodiments, quick play module 130 can select a content category for the user based on contextual data describing the user's current state and/or environment. Quick play module 130 can gather contextual data from a client device $115_i$, the user's profile, etc. For example, a client device $115_i$ can transmit contextual data to content management system 105, such as geographic location data, network connection data, data describing the client device $115_i$, time, date, etc. Further, quick play module 130 can gather contextual data from the user's account, such as data describing the user's address, client devices, content assigned to the user's account, such as movies, applications, music, calendar, social networks, biometric watch data, etc.

In some embodiments, quick play module 130 can select a content category based on the time of day or time of year. For instance, if a user selects to initiate quick play mode late at night, quick play module 130 may select a content category that is calming and well suited for a person ready to go to bed. As another example, if a user selects to initiate quick play mode during December, quick play module 130 can select a content category that has a holiday or Christmas theme, such as Christmas music, movies, etc.

In some embodiments, quick play module 130 can select a content category for a user based on the geographic location of the user. For example, if a user initiates quick play mode while in a foreign country, quick play module 130 can select a content category associated with the country, such as regional music, movies, etc. As another example, if a user initiates quick play mode while at a gym, quick play module 130 can select a content category that is energizing, motivational and/or upbeat, such as high energy music.

In some embodiments quick play module 130 can select a content category that the user has selected in the past under similar or the same context. As an example, if the user initiates quick play mode in the morning, quick play module 130 can analyze the user preference data to determine what content categories the user has selected in the past in the morning and select one of the determined content categories. For instance, quick play module 130 can select the content category that the user has most commonly selected in the morning.

In some embodiments, quick play module 130 can select a content category for a user based on user preference data gathered from a plurality of users. To accomplish this, quick play module 130 can communicate with content storage 160 to gather and analyze user preferences data from a plurality of users. For example, quick play module 130 can gather user preference data from all users, a subset of users, a subset of users that are similar to the user, etc. Quick play module 130 can analyze the gathered user preference data to determine a content category commonly selected by similar user, commonly selected under similar or the same context, etc.

In some embodiments, quick play module 130 can select a content category based on content items that are available to the requesting user. For example, quick play module 130 can identify a set of candidate content items that the requesting user is authorized to access. This can include content items assigned to the user's account as well as content items that are not assigned to the user's account but may be accessed by the users account. For example, certain content items can be designates as being free of restriction and can be accessed by all users, as another example, certain content items may be free of restriction for a limited time, for example, while the content item is included as part of a curated playlist, radio station, etc.

Quick play module 130 can analyze metadata associated with the set of candidate content items to determine the content items from the various content categories. Quick play module 130 can then select a content category based on the available candidate content items in each content category. For example, quick play module 130 can select the content category with the greatest number of content items. As another example, quick play module 130 can select from the content categories that have at least a threshold number of candidate content items. Requiring that a threshold number of candidate content items be available can ensure that there will be sufficient content items available for the selected content category.

In some embodiments, quick play module 130 can select a content category based on the content mediums available for the content categories. For example, quick play module 130 can identify, based on the candidate content items available for each content category, the number of different content mediums available for each content category. This can include determining the number of playlists, albums, curated playlists, online radio stations, podcasts, etc., that are available for the content category.

Quick play module 130 can then select a content category based on the available content mediums. For example, quick play module 130 can select the content category with the most available content mediums. As another example, quick play module 130 can identify the content categories that have a predetermined threshold number of available content mediums and select a content category from one of the identified content categories.

In some embodiments, quick play module 130 can identify qualified content mediums for a content category and then determined the content category based on the qualified content mediums. A qualified content medium can be a delivery medium that has a number of available content items that meets or exceeds a predetermined threshold number of content items. Content methods that do not meet the threshold number of content items can be determined to be unqualified because there are not a sufficient number of the content items available.

Quick play module 130 can select a content category based on the number of qualified content mediums available to the genre. This can include selecting the content category with the most qualified content mediums, selecting a genre from a set of content categories that have a predetermined threshold number of qualified content mediums, etc. Quick play module 130 can select a content category based on any one or more of the factors listed above (e.g., available content items, contextual data, user preference data, available delivery mediums, etc.).

In some embodiments, quick play module 130 can rank and/or calculate a score for the content categories based on one or more of the factors and then select a content category based on the ranking. Quick play module 130 can calculate a score for the content categories in any way known in the art. For example, quick play module 130 can apply weights to the different factors to indicate the perceived importance of the factor and then calculate a score for each content category based on the weighted factors. In some embodiments, weights can be assigned to the factors based on perceived relevance or accuracy of the associated data. For example, the weight assigned to user preference data can be reduced as the data becomes older.

Quick play module 130 can select a content category based on the calculated score or ranking. For example, quick play module can select the content category with the highest score or ranking, a content category that has a score or ranking that meets or exceeds a predetermined threshold score or ranking, etc.

In addition to selecting a content category for the user, quick play module 130 can also select a content medium in which to deliver the content to the user. For example, quick play module 130 can select to deliver content in content mediums such as an album, playlist, podcast, curated playlist, video, radio etc.

In some embodiments, quick play module 130 can select a content medium based on the selected content category. For example, certain content categories may be associated with one or more preferred content mediums for delivery and quick play module 130 can be configured to select one of the preferred content mediums. As an example, content categories such as 80's music and Christmas music may be associated with a preferred content medium such as a playlist because users commonly do not want to listen to an entire album from a single artist, but rather prefer a number of hits from the content category. As another example, content categories such as audio books or live concert recordings may be associated with a preferred content medium such as album because users may prefer to listen to albums from these content categories in their entirety. As another example, content categories such as news and sports may be associated with a preferred content medium such as podcast because users may prefer content from these content categories to reflect current events.

Alternatively, in some embodiments, quick play module 130 can select a content category based on a selected content medium. For example, a user may select a specific content medium or quick play module 130 may first select a content medium and then quick play module 130 may select a content category based on the selected content medium.

In some embodiments, quick play module 130 can select a content medium based on contextual data such as, time of day, day of year, geographic location, client device type, network connection, etc. For example, if a user has a low bandwidth connection, quick play module 130 can select a content medium such as albums to play content items currently available on the user's device and thereby reduce network usage. As another example, if the user has a high bandwidth connection, quick play module 130 can select a content medium such as podcast or radio, because streaming data over the network may not be as much of an issue.

In some embodiments, quick play module 130 can select a content medium based on user preference data of the user. For example, quick play module 130 can select a content medium for a selected content category based on the user's previous history with the specified content category. For instance, quick play module 130 can select a content medium that the user has selected in the past to deliver the specified content category. In some embodiments, quick play module 130 can rank the content mediums the user has selected in the past for a specified content category and select a content medium based on the ranking. For example, quick play module 130 can rank the content mediums based on the number of times the user has selected the content medium, how recently the user selected the content medium, how long the user played the content in the content medium, etc. Quick play module 130 can select then select a content medium based on the ranking. For example, quick play module 130 can select the content medium with the highest ranking, select from a set of the highest ranked content mediums, select a content medium that has met a threshold ranking, etc.

In some embodiments, quick play module 130 can select a content medium based on how familiar the user is with the selected content category. For example, if a user has rarely played content from the selected content category and/or has limited content from the content category assigned to their user account, quick play module 130 can select a content medium such as a curated playlist or radio to introduce the user to new content from the content category. Conversely, if the user commonly plays content from the selected content category and/or has a large amount of content from the content category assigned to the user account, quick play module 130 can select a content medium such as a full album or user generated playlist to play the user with the content in a content medium the user is familiar with.

In some embodiments, quick play module 130 can select a content medium based on user preferences data and contextual data. For example, quick play module 130 can select a content medium which the user has selected in the past when in a similar or the same context. Quick play module 130 can rank the content mediums based on the contextual data and select a content medium based on the ranking.

In some embodiments, quick play module 130 can select a content medium based on user specified preferences. For example, content management system 105 can enable a user to select preferences regarding the content mediums the user prefers based on content category. The user selected preferences can be stored in the user's account and quick play module 130 can access the users account to select a content medium based on the user's selections.

In some embodiments, quick play module 130 can select a content medium for a user based on user preference data gathered from a plurality of users. To accomplish this, quick play module 130 can communicate with content storage 160 to gather and analyze user preferences data from a plurality of users. This can include gathering and analyzing content use data describing user interactions with content, including the content categories selected by users, the content mediums selected by the user, as well as any associated contextual data. Quick play module 130 can gather user preference data from all users, a subset of users, a subset of users that are similar to the user, etc. Quick play module 130 can analyze the gathered user preference data to determine a content medium commonly selected for the content category, commonly selected under similar or the same context, etc.

In some embodiments, quick play module 130 can select a content medium based on the number of content items available in the content medium. For example, quick play module 130 can select a content medium that has the most available content items or a content medium that has at least a threshold number of content items available.

Quick play module 130 can select a content medium based on any one or more of the factors listed above. In some embodiments, quick play module 130 can rank and/or calculate a score for the content mediums based on one or more of the factors and then select a content medium based on the ranking. Quick play module 130 can calculate a score for the content mediums in any way known in the art. For example, quick play module 130 can apply weights to the different factors to indicate the perceived importance of the factor and then calculate a score for each content medium based on the weighted factors. In some embodiments, weights can be assigned to the factors based on perceived relevance or accuracy of the associated data. For example, the weight assigned to user preference data can be reduced as the data becomes older.

Quick play module 130 can select a content medium based on the calculated score or ranking. For example, quick play module can select the content medium with the highest score or ranking, a content medium that has a score or ranking that meets or exceeds a predetermined threshold score or ranking, etc.

After selecting a content category and content medium, quick play module 130 can deliver content items from the selected content category to the requesting client device 115$_i$. The content items can be delivered in the selected content medium. For example, if the selected content medium is an album, quick play module 130 can transmit, download, stream and/or otherwise provide the content items from the album to the client device 115$_i$. As another example, if the selected content medium is a playlist quick play module 130 can transmit, download, stream and/or otherwise provide the content items from the playlist to the client device 115$_i$. In some embodiments, some of the content items can be stored locally on the client device 115$_i$ and quick play module 130 can transmit a command and/or instruction to the client device 115$_i$ to access and play the content item from local memory.

Figure 2:
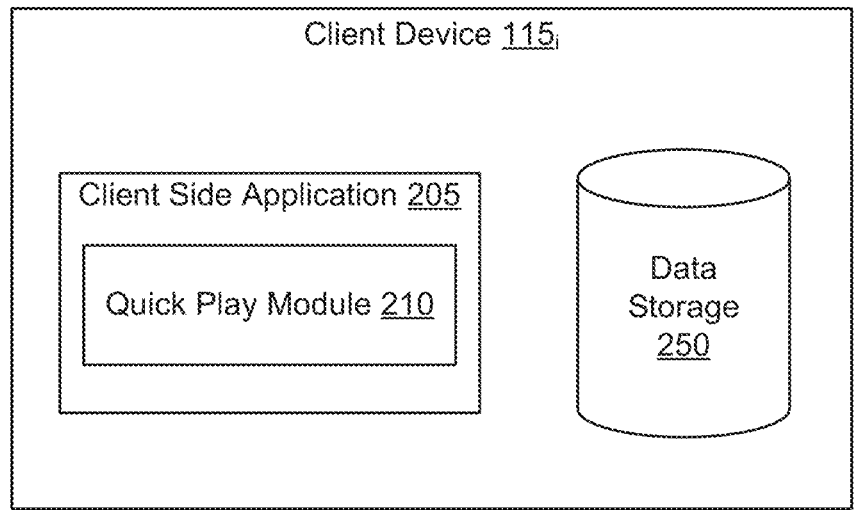
FIG. 2 shows an embodiment of a client device $115_i$ configured to initiate quick play mode.

FIG. 2 shows an embodiment of a client device 115$_i$ configured to initiate quick play mode. FIG. 2 will be described in view of the system shown in FIG. 1.

As shown, client device 115$_i$ can include client side application 205. Client side application 205 can be configured to communicate with content management system 105 and provide a user of client device $115_i$ with functionality offered by content management system 105. This can include enabling a user to login to the user's account with content management system 105, view and access content items assigned to the user's account, create playlists, view and access curated playlist, set user preferences, etc. For example, client side application 205 can present a user with a content management interface where the user can select various options, view their content library, select to play content items, etc.

Client device $115_i$ further includes data storage 250. Data storage 250 can be configured to store any type of data. For example, data storage 250 can store content items, playlist records, configuration data, user preference data, etc. Client side application 205 can present and enable a user to access content item from data storage 250 as well as content items maintained by content management system 105.

Client side application 205 can further include quick play module 210 configured to enable a user to initiate quick play mode. For example, quick play module 210 can present a user with a user interface element, such as button, which the user can actuate to initiate quick play mode. In response to a user actuating the user interface element, quick play module 210 can transmit a quick play mode request to content management system 105.

In some embodiments, quick play module 210 can gather contextual data and transmit the contextual data as part of the quick play mode request. For example, quick play module 210 can gather geographic location information describing the geographic location of client device $115_i$ from a global positioning system (GPS) of client device $115_i$, and include the geographic location information in the quick play mode request. As another example, quick play module 210 can gather networking data such as the type of network client device $115_i$ is connected to and include the networking data in the quick play mode request. As another example, quick play module 210 can gather device data describing client device $115_i$, including capabilities, components, operating system, installed applications, battery life remaining, etc., and provide the device data to content management system 105 along with the quick pay mode request.

In some embodiments, quick play module 210 can initiate quick play mode without communicating with content management system 105. This can be useful when client device $115_i$ is not in network connection with content management system 105. For example, quick play module 210 can be configured to select a content category and content medium for a user. For example, quick play module 210 can select a content category and content medium based on locally stored data in data storage 250, such as user preference data, content user data, etc. Quick play module 210 can then play locally stored content items stored in data storage 250.

In some embodiments, content management system 105 can transmit data to client device $115_i$ that can be used to initiate quick play mode. For example, content management system 105 can transmit data indicating rankings of content categories, content mediums best suited for the content categories, etc., to client device $115_i$. The data can be stored in data storage 250 and used by quick play module 210 to initiate quick play mode for a user.

Figure 3:
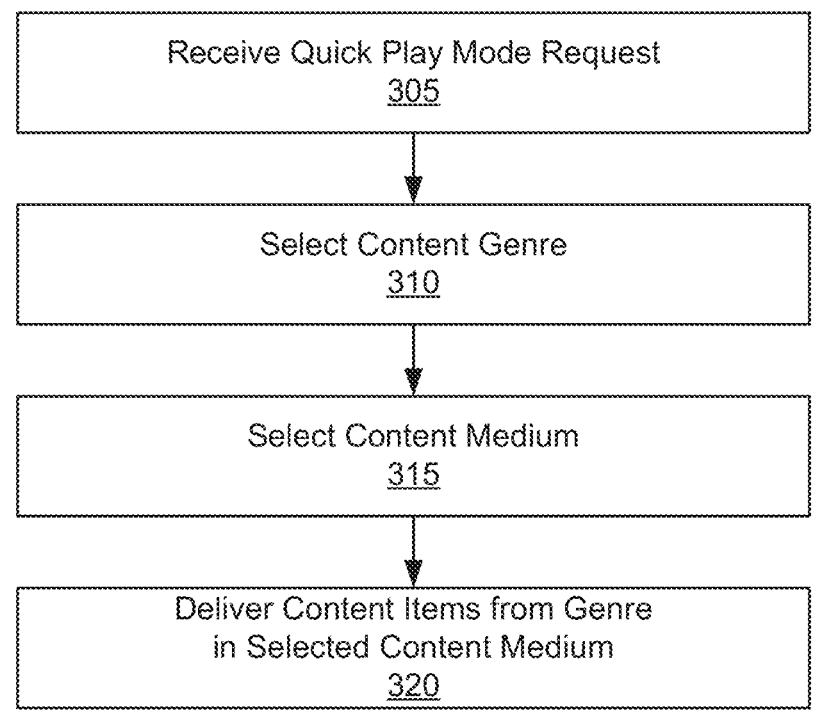
FIG. 3 shows an example method of a content management system initiating quick play mode.

FIG. 3 shows an example method of a content management system initiating quick play mode. The method shown in FIG. 3 is described in view of the systems shown in FIG. 1 and FIG. 2. Although specific steps are shown in FIG. 3, in other embodiments the method may have more or less steps. Further, the order in which the steps are performed is just one possible embodiment and is not meant to be limiting. The method may be performed in a variety of differing orders, including one or more steps being performed simultaneously, and/or including more or less steps than those shown in FIG. 3.

At block 305, the content management system 105 receives a quick play mode request from a client device $115_i$. A quick play mode request can be a request indicating that a user of the client device $115_i$ would like to initiate quick play mode. In some embodiments, the quick play mode request can include contextual data describing the user's current state and/or environment. For example, the quick play mode request can include contextual data such the user's geographic location, network connection type, device data, etc.

At block 310, the content management system 105 can select a content category for the user. The content management system 105 can select a content category for the user in numerous ways. For example, a quick play module 130 can analyze user preference data associated with the user to identify content categories that the user likes and dislikes and then select a content category that the user likes. Additionally, the quick play module 130 can select a content category for the user based on contextual data received from the user. For example, the quick play module 130 can identify content categories that the user, group of users, etc., selected in similar or the same context and select one of the identified content categories for the user.

At block 315, the content management system 105 can select a content medium to deliver the content to the user. In some embodiments, the content management system 105 can select the content medium based on the selected content category. For example, specified content categories can be associated with one or more preferred content mediums. The quick play module 130 can identify the preferred content mediums for the content category and select one of the preferred content mediums for the user. As another example, the quick play module 130 can select a content medium based on contextual data received from the user. For example, the quick play module 130 can identify content mediums that the user, group of users, etc., selected in similar or the same context and select one of the identified content mediums for the user.

Although the method shown in FIG. 3 describes the content management system 105 selecting a content category prior to selecting a content medium, in some embodiments, the content management system 105 can select the content medium first and then select a content category. In this type of embodiments, the content management system 105 can select the content category based on the selected content medium. For example, the content management system 105 can select a content category that is well suited for the content medium, selected by the user for the specific content medium, etc.

At block 320, the content management system 105 can deliver content items from the content category in the selected content medium. For example, the content management system 105 can stream the content items to the requesting client device $115_i$. Alternatively, the content management system 105 can transmit an instruction to the client device $115_i$ to play a content item stored locally on a data storage 250 of the client device $115_i$.

Figure 4:
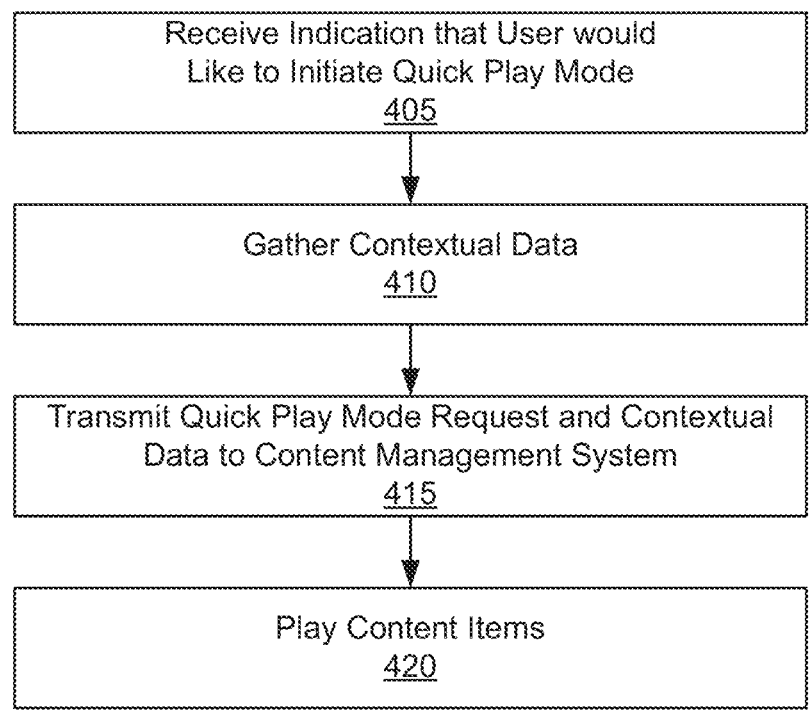
FIG. 4 shows an example method of a client device initiating quick play mode.

FIG. 4 shows an example method of a client device initiating quick play mode. The method shown in FIG. 4 is described in view of the systems shown in FIG. 1 and FIG. 2. Although specific steps are shown in FIG. 4, in other embodiments the method may have more or less steps. Further, the order in which the steps are performed is just one possible embodiment and is not meant to be limiting. The method may be performed in a variety of differing orders, including one or more steps being performed simultaneously, and/or including more or less steps than those shown in FIG. 4.

At block 405, the client device $115_i$ receives an indication that a user would like to initiate quick play mode. This indication can be received as a result of the user selecting a user interface element to initiate quick play mode. As another example, the indication can be received as a result of a user shaking the client device $115_i$. For example, if quick play mode is already initiated, the client device $115_i$ can enable the user to shake the client device $115_i$ to reinitiate quick play mode, causing a new content category and content medium to be selected for the user.

As another example, the indication can be received as a result of a user actuating a physical button or user interface element on a computing device in network connection with the client device $115_i$. For example, a user may have their client device $115_i$ paired to their car stereo and the user can select a physical button on the steering wheel to cause the indication that the user would like to initiate quick play mode.

As another example, the indication can be received as a result of a user selecting to play content items without having any content queued or selected. For example, if a user selects a "play" button without selecting an album, artist, etc., the selection can be the indication that the user would like to initiate quick play mode.

As another example, the indication can be receives as a result of a user providing negative feedback to content items played during quick play mode. For example, a user can provide negative feedback by selecting a dislike button for a content item or skipping a content item. The client device $115_i$ can be configured such that, if a predetermined threshold of negative feedback is received, for example within a predetermined amount of time or total, the client device $115_i$ will determine that the user does not like the current content category and delivery method and select a new content and delivery method for the user.

At block 410, the client device $115_i$ can gather contextual data describing the current state or environment of the user. This can include geographic location data, network data, device, data, etc. For example, a quick play module 210 can gather geographic location data from a GPS component of the client device $115_i$. As another example, quick play module 210 can gather network data identifying the type of network that the client device $115_i$ is connected to.

At block 415, the client device $115_i$ can transmit a quick play mode request and the contextual data to the content management system 105. The quick play mode request can be a request to initiate quick play mode on the client device $115_i$. The content management system 105 can use the contextual data to select a content category and content medium for the user.

At block 420, the client device $115_i$ can play content items as part of quick play mode. For example, the client device $115_i$ can receive and play content items streamed from the content management system 105. Alternatively, the client device $115_i$ can receive an instruction from the content management system 105 to access and play a content item stored locally by the client device $115_i$.

Figure 5A:
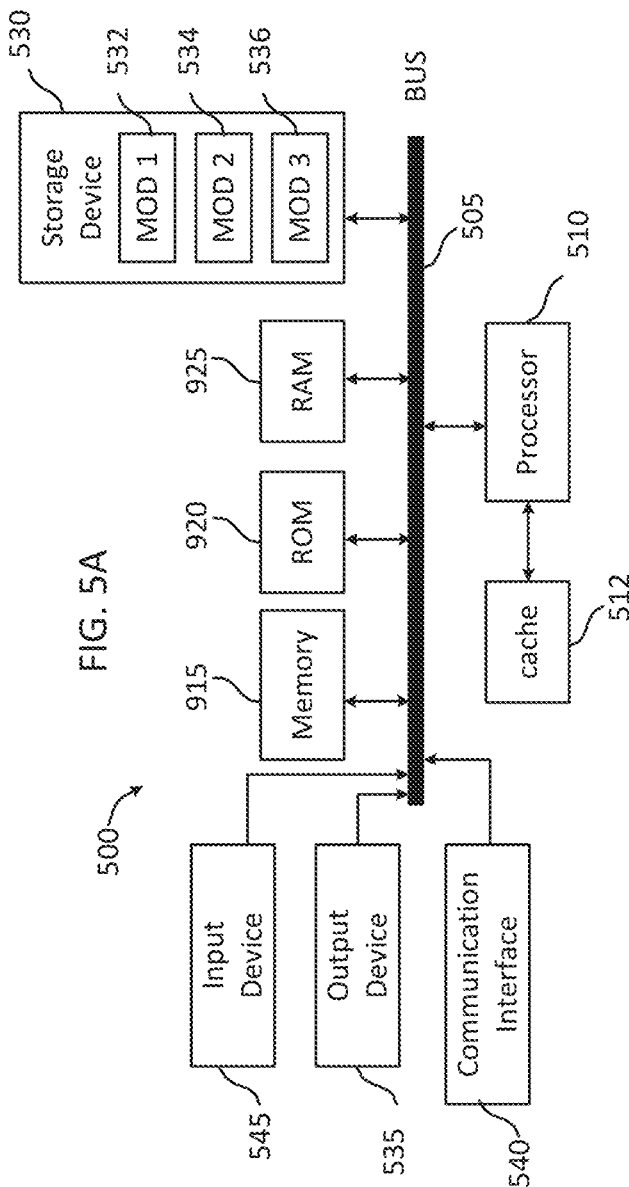
FIGS. 5A and 5B show exemplary possible system embodiments.
Figure 5B:
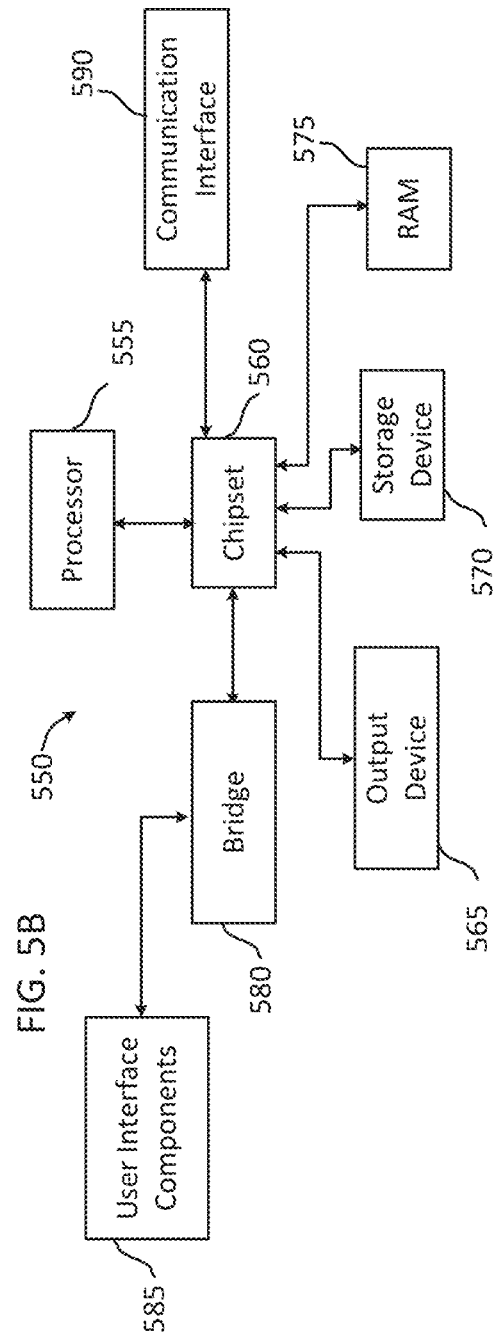

FIG. 5A, and FIG. 5B show exemplary possible system embodiments. The more appropriate embodiment will be apparent to those of ordinary skill in the art when practicing the present technology. Persons of ordinary skill in the art will also readily appreciate that other system embodiments are possible.

FIG. 5A illustrates a conventional system bus computing system architecture 500 wherein the components of the system are in electrical communication with each other using a bus 505. Exemplary system 500 includes a processing unit (CPU or processor) 510 and a system bus 505 that couples various system components including the system memory 515, such as read only memory (ROM) 520 and random access memory (RAM) 525, to the processor 510. The system 500 can include a cache of high-speed memory connected directly with, in close proximity to, or integrated as part of the processor 510. The system 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware module or software module, such as module 1 532, module 2 534, and module 3 536 stored in storage device 530, configured to control the processor 510 as well as a special-purpose processor where software instructions are incorporated into the actual processor design. The processor 510 may essentially be a completely self-contained computing system, containing multiple cores or processors, a bus, memory controller, cache, etc. A multi-core processor may be symmetric or asymmetric.

To enable user interaction with the computing device 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing device 500. The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include software modules 532, 534, 536 for controlling the processor 510. Other hardware or software modules are contemplated. The storage device 530 can be connected to the system bus 505. In one aspect, a hardware module that performs a particular function can include the software component stored in a computer-readable medium in connection with the necessary hardware components, such as the processor 510, bus 505, display 535, and so forth, to carry out the function.

FIG. 5B illustrates a computer system 550 having a chipset architecture that can be used in executing the described method and generating and displaying a graphical user interface (GUI). Computer system 550 is an example of computer hardware, software, and firmware that can be used to implement the disclosed technology. System 550 can include a processor 555, representative of any number of physically and/or logically distinct resources capable of executing software, firmware, and hardware configured to perform identified computations. Processor 555 can communicate with a chipset 560 that can control input to and output from processor 555. In this example, chipset 560 outputs information to output 565, such as a display, and can read and write information to storage device 570, which can include magnetic media, and solid state media, for example. Chipset 560 can also read data from and write data to RAM 575. A bridge 580 for interfacing with a variety of user interface components 585 can be provided for interfacing with chipset 560. Such user interface components 585 can include a keyboard, a microphone, touch detection and processing circuitry, a pointing device, such as a mouse, and so on. In general, inputs to system 550 can come from any of a variety of sources, machine generated and/or human generated.

Chipset 560 can also interface with one or more communication interfaces 590 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 555 analyzing data stored in storage 570 or 575. Further, the machine can receive inputs from a user via user interface components 585 and execute appropriate functions, such as browsing functions by interpreting these inputs using processor 555.

It can be appreciated that exemplary systems 500 and 550 can have more than one processor 510 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method for delivering content from a content delivery server for playback comprising:
  in response to receiving a first request at a client device to play one or more unspecified content items in a media application configured to play a plurality of content mediums:
    selecting, based on contextual data associated with an environment of the client device:
      a first content medium of the plurality of content mediums, and
      a first content category of media from a plurality of available content categories; and
    determining a first content item for playback within the first content category and the first content medium.

2. The method of claim 1, wherein the first play-mode request comprises a continual quick play mode, and wherein the continual quick play mode causes:
  selecting a second content category;
  ranking the plurality of content mediums based at least in part on a number of times a user of the client device has previously selected each of the plurality of content mediums; and
  selecting a second content medium based on the ranking of the plurality of content mediums; and
  determining a second content item for playback within the second content category and the selected second content medium.

3. The method of claim 2, wherein each of the plurality of content mediums are ranked based at least in part on a weighted score applied based on the number of times the user has previously selected each of the plurality of content mediums, and wherein the weighted score is adjusted based on how recently the user previously selected each of the plurality of content mediums.

4. The method of claim 1, wherein the first content medium is selected based on devices the client device is connected to.

5. The method of claim 1, wherein selecting the first content medium further comprises:
   determining, based on content use data associated with a plurality of users, plurality of content medium types that were selected by the plurality of users under a same or similar contextual circumstance.

6. The method of claim 1, wherein the contextual data includes biometric data associated with a user of the client device.

7. The method of claim 1, wherein the first content medium is selected based on a client device type and a network bandwidth of the client device.

8. A system for delivering content for playback comprising:
   a computer processor; and
   a memory containing instructions that, when executed, cause the computer processor to:
      in response to receiving a first request at a client device to play one or more unspecified content items in a media application configured to play a plurality of content mediums:
         select, based on contextual data associated with an environment of the client device:
            a first content medium of the plurality of content mediums, and
            a first content category of media from a plurality of available content categories; and
         determine a first content item for playback within the first content category and the first content medium.

9. The system of claim 8, wherein the first play-mode request comprises a continual quick play mode request, wherein the continual quick play mode request causes the system to:
   select a second content category;
   rank the plurality of content mediums based at least in part on a number of times a user of the client device has previously selected each of the plurality of content mediums; and
   select a second content medium based on the ranking of the plurality of content mediums; and
   determine a second content item for playback within the second content category and the second content medium.

10. The system of claim 9, wherein each of the plurality of content mediums are ranked based at least in part on a weighted score applied based on the number of times the user has previously selected each of the plurality of content mediums, and wherein the weighted score is adjusted based on how recently the user previously selected each of the plurality of content mediums.

11. The system of claim 8, wherein the first content medium is selected based on devices the client device is connected to.

12. The system of claim 8, wherein selecting the first content medium further comprises:
   determining, based on content use data associated with a plurality of users, a plurality of content medium types that were selected by the plurality of users under a same or similar contextual circumstance.

13. The system of claim 8, wherein the contextual data includes biometric data associated with a user of the client device.

14. The system of claim 8, wherein the first content medium is selected based on a client device type and a network bandwidth of the client device.

15. A non-transitory computer-readable medium for delivering content for playback containing instructions that, when executed by a computer processor, cause the computer processor to:
   in response to receiving a first request at a client device to play one or more unspecified content items in a media application configured to play a plurality of content mediums:
      select, based on contextual data associated with an environment of the client device:
         a first content medium of the plurality of content mediums, and
         a first content category of media from a plurality of available content categories; and
      determine, a first content item for playback within the first content category and the first content medium.

16. The non-transitory computer-readable medium of claim 15, wherein the first request is a continual quick play mode, and wherein the continual quick play mode causes the computer processor to:
   select a second content category;
   rank the plurality of content mediums based at least in part on a number of times a user of the client device has previously selected each of the plurality of content mediums; and
   select a second content medium based on the ranking of the plurality of content mediums; and
   determine a second content item for playback within the second content category and the second content medium.

17. The non-transitory computer-readable medium of claim 16, wherein each of the plurality of content mediums are ranked based at least in part on a weighted score applied based on the number of times the user has previously selected each of the plurality of content mediums, and wherein the weighted score is adjusted based on how recently the user previously selected each of the plurality of content mediums.

18. The non-transitory computer-readable medium of claim 15, wherein the first content medium is selected based on devices the client device is connected to.

19. The non-transitory computer-readable medium of claim 15, wherein selecting the first content medium further comprises:
   determining, based on content use data associated with a plurality of users, a plurality of content medium types that were selected by the plurality of users under a same or similar contextual circumstance.

20. The non-transitory computer-readable medium of claim 15, wherein the contextual data includes biometric data associated with a user of the client device.

* * * * *

UNITED STATES PATENT AND TRADEMARK OFFICE
CERTIFICATE OF CORRECTION

| | |
|---|---|
| PATENT NO. | : 12,039,225 B2 |
| APPLICATION NO. | : 17/652783 |
| DATED | : July 16, 2024 |
| INVENTOR(S) | : Thomas Alsina et al. |

Page 1 of 1

It is certified that error appears in the above-identified patent and that said Letters Patent is hereby corrected as shown below:

In the Claims

Claim 2, Column 18, Line 48: remove the word "play-mode"

Claim 2, Column 18, Line 59: remove the word "selected"

Claim 5, Column 19, Line 8: insert --a-- after "users,"

Claim 9, Column 19, Line 34: remove the word "play-mode"

Signed and Sealed this
Fourth Day of February, 2025

Coke Morgan Stewart
*Acting Director of the United States Patent and Trademark Office*